(12) United States Patent
Nilsson

(10) Patent No.: US 8,194,156 B2
(45) Date of Patent: Jun. 5, 2012

(54) EXIF OBJECT COORDINATES

(75) Inventor: Peter Nilsson, Malmö (SE)

(73) Assignee: Sony Ericsson Mobile Communications AB, Lund (SE)

( * ) Notice: Subject to any disclaimer, the term of this patent is extended or adjusted under 35 U.S.C. 154(b) by 505 days.

(21) Appl. No.: 11/969,984

(22) Filed: Jan. 7, 2008

(65) Prior Publication Data

US 2009/0174798 A1 Jul. 9, 2009

(51) Int. Cl.
*H04N 5/262* (2006.01)
*H04N 5/222* (2006.01)
*G06K 9/62* (2006.01)

(52) U.S. Cl. .................... 348/239; 348/333.02; 382/224

(58) Field of Classification Search ............. 348/239
See application file for complete search history.

(56) References Cited

U.S. PATENT DOCUMENTS

| | | | |
|---|---|---|---|
| 5,893,095 A | 4/1999 | Jain et al. | |
| 6,833,865 B1 | 12/2004 | Fuller et al. | |
| 6,999,623 B1 * | 2/2006 | Yamaoka et al. | 382/209 |
| 7,924,340 B2 * | 4/2011 | Kato | 348/333.05 |
| 2003/0067551 A1 * | 4/2003 | Venturino et al. | 348/364 |
| 2005/0094854 A1 * | 5/2005 | Kim | 382/118 |
| 2005/0264658 A1 * | 12/2005 | Ray et al. | 348/239 |
| 2006/0140508 A1 | 6/2006 | Ohgishi et al. | |
| 2006/0158534 A1 * | 7/2006 | Gotohda | 348/239 |
| 2006/0215753 A1 | 9/2006 | Lee et al. | |
| 2006/0221197 A1 * | 10/2006 | Jung et al. | 348/222.1 |
| 2006/0274978 A1 | 12/2006 | Fukuda et al. | |
| 2007/0057933 A1 * | 3/2007 | Ohno et al. | 345/204 |
| 2007/0080971 A1 * | 4/2007 | Sung | 345/545 |
| 2007/0274592 A1 | 11/2007 | Matsuhira | |
| 2008/0284864 A1 * | 11/2008 | Kotake et al. | 348/222.1 |

FOREIGN PATENT DOCUMENTS

GB 2 395 853 A 6/2004

OTHER PUBLICATIONS

International Search Report issued in corresponding international application No. PCT/EP2008/058431, mailed Sep. 2, 2008, 4 pages.

* cited by examiner

*Primary Examiner* — Albert Cutler
(74) *Attorney, Agent, or Firm* — Harrity & Harrity, LLP

(57) ABSTRACT

An image acquisition device may include a sensing unit to register optical information and convert it into raw image data including intensity information associated with the optical information; and a processing unit to convert the raw image data into digital image information, where the processing unit is configured to identify one or more objects in the converted digital image information and store coordinates associated with the identified one or more objects as metadata.

14 Claims, 3 Drawing Sheets

EXIF OBJECT COORDINATES

TECHNICAL FIELD

The present invention is generally related to the field of image processing and, more particularly, to adding data to a captured image.

BACKGROUND OF THE INVENTION

Recently, digital image capturing has become very popular with the general public. Also, the introduction of so-called Internet communities where users on a website may share diverse forms of information with each other, including digital images, have contributed to the immense popularity of digital imaging.

Digital photographing also has a number of other advantages, such as a relatively easy image processing and also the possibility to add so called metadata to digital image files.

Metadata may be best described as additional information which is related to the image acquired. One known example of metadata is the so-called exchangeable image format (EXIF) information, which among others, states the type of camera and also exposure as well as shutter time and lens opening which the digital image has been captured with.

Recently, in some of the internet communities where users may share digital images, features such as the manual identification of human faces in a digital image have become available. However, the manual identification is cumbersome, especially if a whole series of pictures have to be marked.

Manual identification of human faces becomes especially cumbersome when constructing a slide show of digital images where the software application used to construct the slideshow is to perform zooming into the manually identified areas of the images during the slideshow.

Thus, embodiments of the present invention obviate at least some of the disadvantages associated with such technology.

SUMMARY OF THE INVENTION

According to a first aspect, an image acquisition device comprises a sensing unit to register optical information, and convert the optical information into raw image data including intensity information associated with the optical information; and a processing unit to convert the raw image data into digital image information, identify one or more objects in the converted digital image information, and store coordinates associated with the identified one or more objects as metadata.

According to a second aspect, the image acquisition device according to the first aspect further comprises a memory to store the converted digital image information and the metadata indicative of the coordinates associated with the identified one or more objects.

A third aspect is directed to the image acquisition device according to the first or second aspects, wherein the processing unit is configured to identify one or more objects in the converted digital image information by comparing at least a part of the converted digital image information to a predefined set of known objects.

A fourth aspect is directed to the image acquisition device according to the first or second aspects, wherein the processing unit is configured to store the metadata separately from the digital image information.

A fifth aspect is directed to the image acquisition device according to the first or second aspects, wherein the processing unit is configured to store the metadata together with the digital image information.

A sixth aspect is directed to the image acquisition device according to any of the first through fifth aspects, wherein the processing unit is configured to enclose the identified one or more objects in the digital image information by one or more geometrical shapes.

A seventh aspect is directed to the image acquisition device according to any of the first through sixth aspects, wherein the coordinates associated with the identified one or more objects include coordinates of geometrical shapes in the digital image information.

An eighth aspect is directed to the image acquisition device according to any of the first through seventh aspects, wherein the metadata includes coordinates of one or more geometrical shapes enclosing the identified one or more objects in the digital image information and the type of object identified in the digital image information.

A ninth aspect is directed to the image acquisition device according to any of the first through eighth aspects, wherein the image acquisition device comprises a user interface to define geometrical shapes for enclosing the identified one or more objects in the digital image information.

A tenth aspect is directed to the image acquisition device according to any of the first through ninth aspects, wherein the sensing unit comprises one of CMOS—(complementary metal oxide semiconductor), CCD—(charge-coupled device) or CID—(contact image sensor) based sensing unit.

An eleventh aspect is directed to the image acquisition device according to any of the first through tenth aspects, wherein the memory comprises at least one of an internal memory or an external memory.

A twelfth aspect is directed to the image acquisition device according to the first or eleventh aspects, wherein the processing unit is configured to store the digital image information in an internal memory before storing the metadata and the digital image information in an external memory.

A thirteenth aspect is directed to the image acquisition device according to any of the first through eleventh aspects, wherein the processing unit is configured to compress the digital image information before the identifying the one or more object in the digital image information.

A fourteenth aspect is directed to the image acquisition device according to any of the first through thirteenth aspects, further comprising a transceiver arrangement for transferring the metadata and the digital image information to a terminal or node in a wireless communication network.

According to a fifteenth aspect, a method for image acquisition and processing comprises registering optical information and converting the optical information into raw image data including intensity information associated with the optical information; converting the raw image data into digital image information; identifying one or more objects in the digital image information; and storing coordinates associated with the one or more identified objects as metadata.

A sixteenth aspect is directed to the method for image acquisition and processing according to the fifteenth aspect, wherein the step of identifying one or more objects in the digital image information is performed while subsequent optical information is registered by the sensing unit.

A seventeenth aspect is directed to the method for image acquisition and processing according to the fifteenth aspect, wherein the step of identifying one or more objects in the digital image information is performed when no optical information is registered.

DETAILED DESCRIPTION OF PREFERRED EMBODIMENTS

Figure 1:
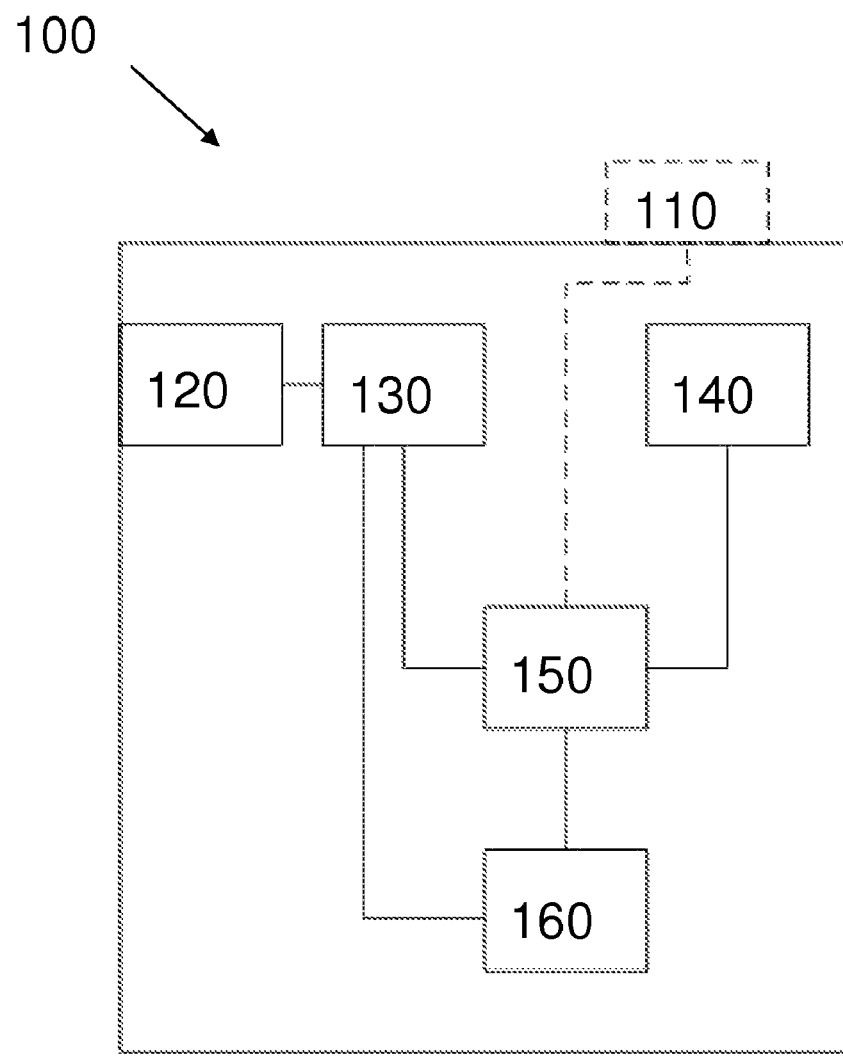
FIG. 1 illustrates an image acquisition device according to one embodiment of the present invention.

FIG. 1 illustrates an image acquisition device 100 according to one embodiment of the present invention.

In the example in FIG. 1, image acquisition device 100 may include an optical unit 120, a sensing unit 130, a user interface 140, a processing unit 150, and a memory 160. Image acquisition device 100 may also include a transceiver arrangement 110.

Using optical unit 120, for example, as a lens, sensing unit 130 may register or capture (e.g., record) images of fixed or moving objects within a field of view of optical unit 120. Also, using different types of optical units 120, different amounts of a motive may be captured. Also, optical unit 120 may include a lens having a fixed or a variable focal length as well an anti-vibration mechanism to prevent blurry images due to long exposure times and small movement of the camera during the exposure. However, since such optical units are known to the skilled person, their detailed function will not be elaborated further in this disclosure.

The sensing unit 130, which may include a CMOS— (Complementary Metal Oxide Semiconductor), a CCD— (Charge-Coupled Device), a CID—(Contact Image Sensor) based image acquisition unit or some other type of image acquisition unit, is adapted for registering, for example, the analog optical image visible through optical unit 120 and convert it into raw image data including digital intensity-based image data along with color information. However, the raw digital image data acquired by sensing unit 130 may not be a "real" digital image.

Using processing unit 150, the raw digital image data may be converted into a digital image file, which may be a JPG (Joint Picture Group), JFIF (JPEG File Interchange Format), PNG (Portable Network Graphics), GIF (Graphics Interchange Format) or some other type of digital image format. For example, processing unit 150 may be adapted to execute an object recognition algorithm on the converted picture to discover one or more predefined objects in the digital image. This can be a cumbersome and time-consuming process and may be best performed in the background while sensing unit 130 is capturing additional image data. Also, the complexity and difficulty of the image processing is also related to the resolution of sensing unit 130. Greater resolutions may produce greater amounts of image data to be processed by processing unit 150. Background operations may also decrease the time period after which image acquisition device 100 is ready to capture another image. However, processing unit 150 may also be adapted to perform object recognition algorithms directly after receiving raw image data from sensing unit 130 and converting the data to, for example, a digital image file. Object recognition algorithms for recognizing objects in a digital image are known to the skilled person and will be not be elaborated further here. Known algorithms may comprise Principal Component Analysis (PCA), Independent Component Analysis (ICA), Linear Discriminant Analysis (LDA), Evolutionary Pursuit (EP), Elastic Bunch Graph Matching (EBGM), so called kernel methods, face transforms or other known algorithms for object recognition in an image.

It may be said, however, that the processing unit in one example may execute the object recognition algorithms based on predefined objects stored in memory 160 of image acquisition device 100. These objects may, for example, include human faces, animals, different objects for playing games, such as balls, bats, objects of interest, such as churches, cars, and also roadways, landmarks, etc. A skilled person reading the disclosure may also contemplate other objects which might be interesting to identify in an image.

Aside from being adapted for recognizing objects in a digital image, processing unit 150 may also be adapted for marking an area of arbitrary or predetermined regular or irregular shape substantially around the object recognized and to store the coordinates of the marked out area as metadata in memory 160 of image acquisition device 100. The coordinates may include, for example, any locating system (e.g., Cartesian coordinates) relative to any reference associated with the captured image or image data (e.g., an image frame).

However, because the number of coordinates needed to define a shape may vary hugely from one shape to the other, some shapes may more suitable for marking objects in the processed digital image than others, such as squares, rectangles, triangles, or other regular shapes.

Processing unit 150 may be adapted for storing the metadata including the shape coordinates either separately from the processed digital image file in memory 160 or for adding the metadata to the processed digital image file, for example.

Memory 160 may be internal, external or both. Having image acquisition device 100 with both an internal and external memories may have the additional advantage for processing unit 150 of being able to convert the raw image data from sensing unit 130 first to the usually faster internal memory and to perform object recognition algorithms on the converted image data before storing the processed and converted digital image file and the metadata in usually slower the external memory.

Similarly, some of the above-described operations may take place while sensing unit 130 is capturing another image (s).

Using the metadata that includes information indicative of the position of objects in the processed image file, a searchable database may be established via which a user may explicitly search for stored digital images including one or more objects, for example, using an entry in a search query.

As marked by a broken line, image acquisition device 100 may also include a receiver/transmitter combination 11 0 adapted for communication in a wireless communication network. The advantage of having receiver/transmitter combination 100 available may, for example, be the option to transmit the processed digital image data together with the metadata indicative of interesting objects in the digital image to a server unit (not shown) in a wireless communication network. According to some embodiments, one or more such processed and metatagged digital image files may be readily made searchable by an image search service providing the option to search for objects and display digital images containing such objects.

Also, using receiver/transmitter combination 110, processed and metatagged digital images may be shared with other users in the wireless communication network.

Figure 2:
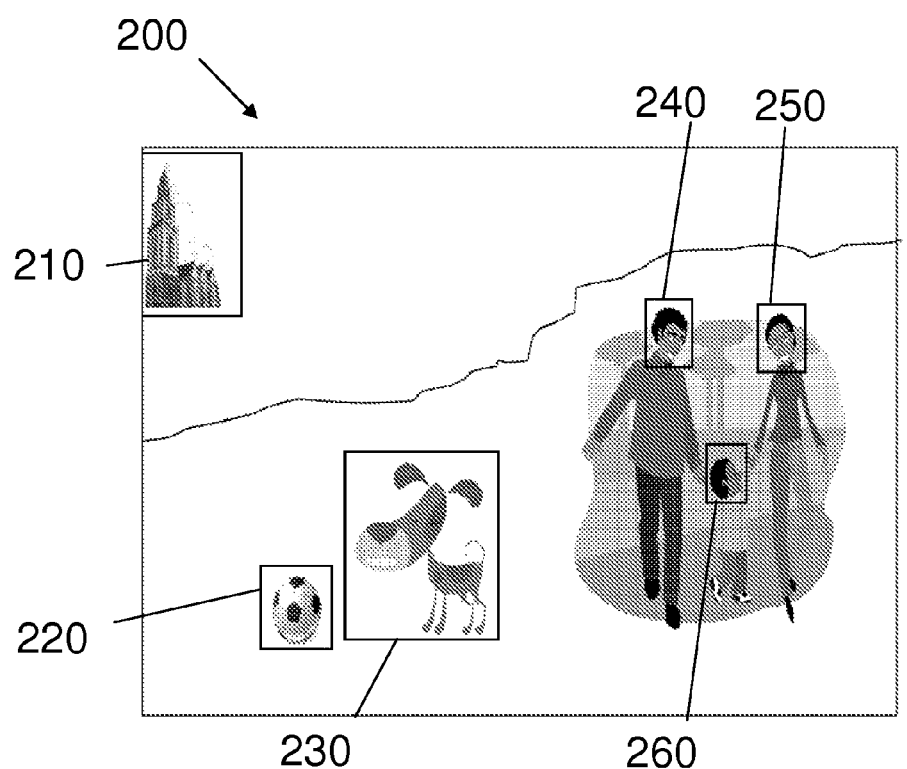
FIG. 2 illustrates a digital image acquired and processed using an exemplary an image acquisition device according to the present invention.

FIG. 2 displays a digital image 200 captured by means of an image acquisition device, such as image acquisition device 100 from FIG. 1. Assume that digital image 200 is the resulting digital image after have been converted from raw image data to a viewable and possible compressed digital image format and after it has been processed by object recognition algorithms.

Using a list of predefined object of interest, such as human faces, animals, objects for playing games, such as balls or bats and other objects of interest, such as churches, roads and so on and comparing them to objects discovered in the digital image, a processing unit, such as processing unit 150 in FIG. 1, may, by using object recognition algorithms, discover objects in the digital image. The processing unit may, as pointed out before, mark out these objects.

One example of marking out recognized objects in a digital picture is illustrated using squares and rectangles surrounding the object of interest in FIG. 2. Using these geometrical shapes, for example, a limited number of coordinates are needed to define them and store them as metadata. In the illustrated example, the processing unit has recognized a church 210, a ball 220, a dog 230, and three human faces 240, 250, and 260.

The processing unit of the image acquisition device, such as processing unit 150 may also be adapted for storing an identifier code characterizing the type of object recognized together with the coordinates of the shape, e.g., square or rectangle, marking out (e.g., delineating) the object(s). Searching for these objects in a database including the processed digital image files and the associated metadata can then be easily performed.

Figure 3:
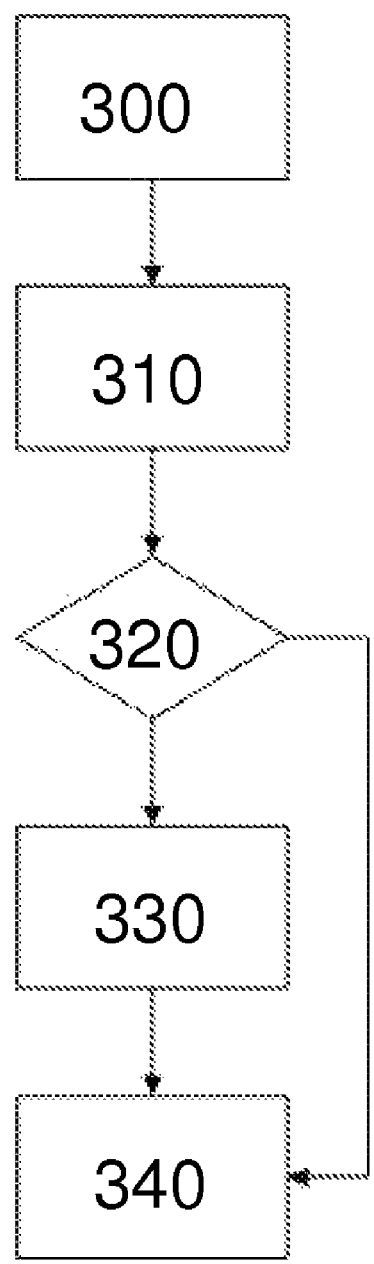
FIG. 3 illustrates exemplary steps of a method for processing digital images according one embodiment of the present invention.

FIG. 3 illustrates the exemplary steps of an embodiment of a method according to the present invention.

At step 300, an image acquisition device, such as image acquisition device 100, may capture, using its image acquisition unit, raw image data representing intensity information from a captured real world motive. The intensity information may additionally be divided into several color channels, such as red, green and blue—the so called RGB-format.

Thereafter, at step 310, a processing unit, such as processing unit 150 of image acquisition device 100, may receive the raw image data from image acquisition device 100 and perform image processing on the raw image data.

In a first instance, this image processing may involve conversion into a compressed digital image format, such as JPG, JFIF, GIF, PNG or uncompressed image formats, such as BMP (bitmap), TIFF (Tagged Image File Format) or other image formats.

Thereafter, processing unit 150 may perform an object recognition algorithm on the converted raw image data to discover objects in the digital image.

For example, processing unit 150 may perform object recognition, as mentioned earlier, by identifying prospective objects in the converted image and then compare the identified prospective objects with a list of predefined objects stored in the memory of image acquisition unit 100, such as memory 160. Such predefined objects may range from human faces, animals, buildings, balls and other playing equipment, for example, as selected or defined by a user.

If at step 320 a match between one or more supposedly discovered objects and one or more predefined objects is discovered, processing unit 150 may, at step 330, mark out or delineate the one or more objects using coordinates as metadata in the memory of image acquisition unit 100. Also, the metadata may be stored in the digital image file. One way of storing the metadata for the processing unit may be to store it together with EXIF (Exchangeable Image File format) data for a compressed digital image file. However, other file formats comprising metadata may be used.

Coordinates for the objects may be defined using any number ways. For example, marking the object's geometrical shapes, such as squares, rectangles, triangles, circles, ellipses, or other regular or irregular shapes. The marking shapes may also be defined or selected by a user of image acquisition device 100. Different shapes may be associated with different types of objects. Using the marking shapes to mark out one or more objects discovered in the converted digital image, processing unit 150 may save the location of the one or more objects in the digital image file by storing the coordinates of the marking shapes as metadata. The advantage of this marking of identified objects is the ability to focus on them, zoom into them, pan over them, and perform other actions when viewing the converted and processed digital image. Also, the marking of the object may be made visible by a suitable image viewing software adapted for showing the marking of the object.

Thereafter, at step 340, processing unit 150 may add the types of object discovered as metadata, such as human faces, buildings, balls, cars, roads, etc. Similar to step 330, this additional metadata may be stored separately from the converted image file or be added to the image file itself.

For example, the coordinates marking out the one or more objects identified in the digital image and the type of object metadata may be stored together.

Using the metadata, an image viewing software or an online image storage service may then make the converted image files searchable. Thus, for example, a search for "cars" or "churches" may provide a search result with digital images containing the object "car" or "church" or synonyms thereof. Indexing and sorting metadata from digital images will not be described here, since it is assumed to be known to the skilled person.

It may be said, however, that the processed and converted digital images according to the present invention by way of example may be viewed in such a way that the processed and converted digital image is shown with the identified objects marked by a geometrical shapes. They may, for example, be clicked on, where are a mouse click may zoom into the object or display the digital image with the clicked object substantially in the center. This may be useful, for example, when dealing with digital images larger than the screen where they are viewed.

However, if at step 320 processing unit 150 does not find any match between the supposed object in the converted digital image and the predefined objects in the memory, processing unit 150 may simply discard the supposedly identified objects and return to processing step 300 to receive new raw image data from the sensing unit of image acquisition device 100.

It may be added that the present invention is in no way limited to the embodiments presented above. They serve merely as examples for better understanding the underlying concept of the present invention. Thus, persons skilled in the art having read the disclosure above may contemplate other possible embodiments without departing from the scope and spirit of the present invention.

What is claimed is:

1. An image acquisition device for acquiring images of multiple, predefined types of objects, the image acquisition device comprising:
   a sensing unit to:
      register optical information, and
      convert the optical information into raw image data including intensity information associated with the optical information; and
   a processing unit to:
      convert the raw image data into digital image information, identify a plurality of potential objects in the digital image information, compare each of the plurality of potential objects to information associated with the predefined types of objects to determine whether one or more of the plurality of potential objects correspond to one of the predefined types of objects, store coordinates, of one or more particular geometric shapes, as first metadata associated with the one or more particular geometric shapes, where the one or more particular geometrical shapes enclose each of the plurality of potential objects that correspond to one of the predefined types of objects, store, as second metadata, a particular object type, of the predefined types of objects, corresponding to each of the plurality of potential objects that correspond to one of the predefined types of objects, determine, in response to a query input via a user interface of the image acquisition device, that the digital image information includes one or more of the predefined types of objects based on the second metadata, and display, based on the first metadata, the digital image information including the one or more of the predefined types of objects, where each of the one or more predefined types of objects are displayed enclosed by the corresponding one of the one or more particular geometric shapes.

2. The image acquisition device of claim 1, further comprising:
a memory to store the converted digital image information and the first and second metadata.

3. The image acquisition device of claim 2, where the memory comprises at least one of:
an internal memory, or
an external memory.

4. The image acquisition device of claim 1, where the processing unit is further to:
store the first and second metadata separately from the digital image information.

5. The image acquisition device of claim 1, where the processing unit is further to:
store the first and second metadata together with the digital image information.

6. The image acquisition device of claim 1, where the processing unit is further to:
enclose the plurality of potential objects that correspond to one of the predefined types of objects using the one or more particular geometrical shapes, of a plurality of geometrical shapes, based on the particular object type.

7. The image acquisition device of claim 1, further comprising:
a user interface to receive a selection, from a user, used to define the one or more particular geometrical shapes, of a plurality of geometrical shapes, for enclosing each of the plurality of potential objects that correspond to one of the predefined types of objects in the digital image information.

8. The image acquisition device of claim 1, where the sensing unit comprises:
a CMOS—(complementary metal oxide semiconductor), CCD—(charge-coupled device) or CID—(contact image sensor) based sensing unit.

9. The image acquisition device of claim 1, where the processing unit is further to:
store the digital image information in an internal memory before storing the first and second metadata and the digital image information in an external memory.

10. The image acquisition device of 1, where the processing unit is further to:
compress the digital image information before identifying the plurality of potential objects in the digital image information.

11. The image acquisition device of claim 1, further comprising:
a transceiver arrangement for transferring the first and second metadata and the digital image information to a terminal or a node in a wireless communication network.

12. A method for acquisition and processing of images of multiple, predefined types of objects, the method comprising:
registering optical information;
converting the optical information into raw image data including intensity information associated with the optical information;
converting the raw image data into digital image information;
identifying a plurality of potential objects in the digital image information;
comparing each of the plurality of potential objects to information associated with the predefined types of objects to determine whether one or more of the plurality of potential objects correspond to one of the predefined types of objects,
storing coordinates, of a particular geometrical shape, where the coordinates are stored as first metadata, and where the particular geometrical shape encloses each of the plurality of potential objects that correspond to one of the predefined types of objects;
storing, as second metadata, a particular object type, of the predefined types of objects, corresponding to each of the plurality of potential objects that correspond to one of the predefined types of objects;
determining, in response to a query input via a user interface, that the digital image information includes one or more of the predefined types of objects based on the second metadata; and
displaying, based on the first metadata, the digital image information including the one or more of the predefined types of objects, where each of the one or more predefined types of objects are displayed enclosed by the corresponding one of the one or more particular geometric shapes.

13. The method of claim 12, where identifying the plurality of potential objects in the digital image information is performed while subsequent optical information is registered.

14. The method of claim 12, where identifying the plurality of potential objects in the digital image information is performed when no optical information is being registered.

* * * * *